United States Patent [19]
Fujita

[11] Patent Number: 5,672,308
[45] Date of Patent: Sep. 30, 1997

[54] METHOD AND APPARATUS FOR FORMING SEAL PORTION OF TUBULAR BODY OF SYNTHETIC RESIN

[75] Inventor: Mamoru Fujita, Tokyo, Japan

[73] Assignee: Yoshino Kogyosho Co., Ltd., Tokyo, Japan

[21] Appl. No.: 553,624

[22] PCT Filed: Apr. 4, 1995

[86] PCT No.: PCT/JP95/00650

§ 371 Date: Jan. 3, 1996

§ 102(e) Date: Jan. 3, 1996

[87] PCT Pub. No.: WO95/27656

PCT Pub. Date: Oct. 19, 1995

[30] Foreign Application Priority Data

Apr. 11, 1994 [JP] Japan ................................ 6-072048

[51] Int. Cl.⁶ .................... B29D 23/20; B29C 65/00
[52] U.S. Cl. .................... 264/248; 264/296; 264/322; 264/DIG. 41; 425/392; 425/515; 425/520; 493/255; 493/308
[58] Field of Search .................... 264/DIG. 41, 248, 264/296; 156/308.4, 309.9, 217, 221, 477.1, 478, 482, 581; 493/308, 255, 259; 425/392, 515, 520

[56] References Cited

U.S. PATENT DOCUMENTS

| | | | |
|---|---|---|---|
| 2,028,112 | 9/1936 | Westin | 264/DIG. 41 |
| 2,413,323 | 12/1946 | Hills | 264/DIG. 41 |
| 2,488,212 | 11/1949 | Lloyd, Jr. | 156/308.4 |
| 2,562,523 | 7/1951 | Brunet | 264/DIG. 41 |
| 3,032,454 | 5/1962 | Rohdin | 264/248 |
| 3,063,890 | 11/1962 | Saumsiegle | 156/221 |
| 4,196,825 | 4/1980 | Kincaid | 156/218 |
| 5,373,965 | 12/1994 | Halm et al. | 222/92 |

FOREIGN PATENT DOCUMENTS

| | | |
|---|---|---|
| 62-144929 | 6/1987 | Japan . |
| 4-6026 | 10/1992 | Japan . |
| 7906144 | 2/1981 | Netherlands .......... 264/DIG. 41 |

*Primary Examiner*—Jan H. Silbaugh
*Assistant Examiner*—Mark Eashoo
*Attorney, Agent, or Firm*—Oliff & Berridge

[57] ABSTRACT

An apparatus and method for forming a seal portion of a tubular body of synthetic resin is provided in which the seal portion has increased density and reduced foaming. The apparatus includes a pair of clamps that clamp an end portion of a tubular body of resin flat. A heater heats and fuses a projecting end portion projecting from the clamps. A bending member bends side projecting portions of the body formed during heating so that they are inwardly projecting. A press member presses the projecting end portion to form a seal portion.

8 Claims, 10 Drawing Sheets

METHOD AND APPARATUS FOR FORMING SEAL PORTION OF TUBULAR BODY OF SYNTHETIC RESIN

TECHNICAL FIELD OF THE INVENTION

The present invention relates to a method and an apparatus for molding a seal portion of a tubular body of synthetic resin, wherein the seal portion of the tubular body is pressed flat, fused and sealed.

BACKGROUND OF THE INVENTION

According to a prior art, a seal portion of a tubular body of synthetic resin is formed as follows. The end portion of the tubular body is pressed by a pair of opposed clamps until it becomes flat. Then, the end portion projecting from the clamps is heated and fused by a heater. Thereafter, the end portion is pressed from front and back sides and sealed by a sealing mold.

According to the prior art, the seal portion of a synthetic resin made tubular body is formed by being pressed with the sealing mold after being heated and fused. Therefore, side projecting portions 4 are undesirably formed at both sides of the seal portion 5, which is the lowest part of the tubular body I (but shown as the top portion in Figures), as shown in FIG. 15.

According to the prior art, the seal portion is formed as the projecting end portion is pressed by the sealing mold after being fused by the heater. Therefore, some fused synthetic resin at the end portion of the tubular body freely flows and comes out of the mold, forming an irregular thick portion as shown in FIG. 16.

Further, since the projecting side portions are projectedly formed at both sides of the seal portion, fingers may be hurt by them while users are using the tube.

Further, the seal portion is formed by the sealing mold as described above, so that it is shaped such as shown in FIG. 15. It is impossible to form the seal portion an any desired shape such as one, for example, comprising a hanger portion for being hung on a bar.

According to the prior art, the seal portion is formed simply by being pressed by the sealing mold after being fused, so that the adhesive strength of the seal portion is not firm enough. Therefore, in a case in which a substance with higher viscosity is filled in the tube, the seal portion would easily be torn when an user squeezes the substance out of the tube. Then, the substance may be squeezed from the torn seal portion.

Further, when the tubular body is composed of plural layers of high gas-barrier quality synthetic resin, the synthetic resin decomposes and foams by an effect of heat while sealing the seal portion. This would cause a leak of a substance out of the tube.

The invention resolves these problems. Therefore, an object of the invention is to increase density of the seal portion and to form the seal portion in a desired shape.

SUMMARY OF THE INVENTION

A method for forming a seal portion of a tubular body of synthetic resin according to the invention will now be explained. First, clamp an end portion of a tubular body of synthetic resin flat by a pair of clamps. Then, heat and fuse a projecting end portion projecting out of the clamps. Finally, press the projecting end portion to form a desired seal portion shape, while reducing a cubic volume of the projecting end portion to 0.65–0.80 times the original volume.

Another method for forming a seal portion of a tubular body of synthetic resin according to the invention comprises the following process. First, clamp an end portion of a tubular body of synthetic resin flat by a pair of clamps. Second, heat and fuse a projecting end portion projecting out of the clamps. Finally, press the projecting end portion to form a desired seal portion shape, while reducing and restricting decomposition and foam of the synthetic resin.

Prior to pressing the projecting end portion into the seal portion, it is desirable that side projecting portions are bent inside. The side projecting portions are formed protrudely from both sides of the projecting end portion while the projecting end portion is heated and fused.

It is also desirable that each of the side projecting portions is bent toward each other along a line about 0–0.5 mm inside from the edge of the flattened end portion.

Apparatus for forming a seal portion of a tubular body of synthetic resin according to the invention comprises a pair of clamps, a heater, a bend means and press mold means. The clamps clamp an end portion of the tubular body of synthetic resin flat. The heater heats and fuses a projecting end portion projecting from the clamps. The bend means bends the fused side projecting portions of the projecting end portion toward the center of the bend means to form inwardly bent side projecting portions. The press mold means presses the projecting end portion, which comprises the inwardly bent side projecting portions, and forms it into a seal portion.

The bend means may comprise an outer jig and an inner jig. The outer jig is capable of sliding above one of the clamps toward the projecting end portion. The outer jig comprises a right angled concaved mold facing the projecting end portion. The concave mold has a width that is the same as or slightly shorter than a width of the flattened end portion.

The inner jig is capable of sliding above the other clamp toward the projecting end portion. The inner jig comprises a projected mold facing the projecting end portion. The projected mold has a width which is such that it does not disturb the bending formation of the side projecting portions in the concaved mold of the outer jig.

It is desirable that a width of the concaved mold of the outer jig is less than 1 mm shorter than a width of the flattened end portion.

The press mold means may comprise a concave jig and a convex jig. The concave jig is capable of sliding above one of the clamps toward the projecting end portion. The concave jig comprises a concaved mold facing the projecting end portion. The concaved mold has a width that is the same as or slightly wider than that of the projecting end portion, which has bent side projecting portions.

The convex jig is capable of sliding above the other clamp toward the projecting end portion. The convex jig comprises a projected mold facing the projecting end portion. The projected mold engages with the concaved mold of the concave jig tightly so that no burr is formed while the projecting end portion is pressed in the concaved mold of the concave jig.

A function of the invention is as follows.

First, the end portion of a synthetic resin made tubular body is pressed flat by a pair of clamps from front and backsides. Each clamp has a flat surface that faces the tubular body. A projecting end portion, which is the edge portion of the end portion of the tubular body, is projected out of the clamps. Then, the projecting end portion is heated by a heater and is fused.

As the projecting end portion is fused, it becomes so weak that it is bent easily. Then, the fused projecting end portion is positioned in a mold and is pressed until the cubic volume thereof is reduced to 0.65–0.80 times the original volume. The mold has a certain desired molding space, so that the seal portion can be formed into a desired shape.

The seal portion is formed by being pressed and reduced in volume to 0.65–0.80 times the original volume so that the seal portion is considerably increased in density. Therefore, the seal portion is firmly sticked and sealed.

When the tubular body is made of synthetic resin having a high gas barrier such as polyamide resin, ethylene vinyl alcohol copolymer resin and polyvinylidene chloride system copolymer resin, such synthetic resin decomposes and foams as the projecting end portion is heated and fused.

However, the projecting end portion is pressed by the press mold means so hard that the foam produced in the resin is reduced in size and number, such that the seal portion, the final product of the projecting end portion, does not include continuous foam.

As the projecting end portion is heated by the heater and is fused, a side projecting portion is formed at each side of the projecting end portion. The width of the projecting end portion including the side projecting portions is longer than that of the end portion. Therefore, before the projecting end portion is pressed by the press mold means, the side projecting portions should be bent inward. This makes it possible to form such a seal portion that does not have any projecting portions at its side.

The press mold means presses the projecting end portion after the side projecting portions are bent inward, forming a seal portion. The press mold means reduces the projecting end portion in volume to 0.65–0.80 times the original volume and forms the seal portion. Further, the press mold means presses the projecting end portion, and reduces the foam, which is produced in the resin, in size and number. The molding space of the press mold means should be tight so that it does not produce a burr around the edge of the seal portion, and it forms the seal portion in a desired shape.

The reason that the projecting end portion is reduced in volume to 0.65–0.80 times the original volume is such that when it is less than 0.65 times, a burr will be formed around the edge of the seal portion and a thickness of the seal portion becomes too thin and the mechanical strength of the seal portion may be weakened. On the other hand, when it is more than 0.80 times the original volume, the seal portion cannot be pressed firmly enough to stick and seal the seal portion to be resistible against any outer force.

DETAILED DESCRIPTION OF PREFERRED EMBODIMENTS OF THE INVENTION

Figure 1A:
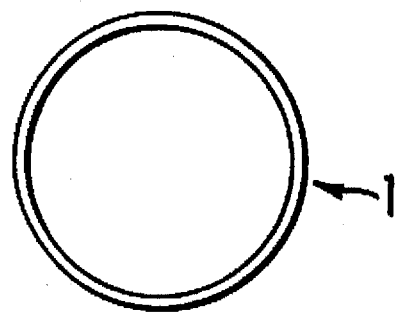
FIG. 1(a) is a top view showing an end portion of a synthetic resin made tubular body.

A preferred embodiment of the invention is described below referring to the drawings.

Figure 1B:
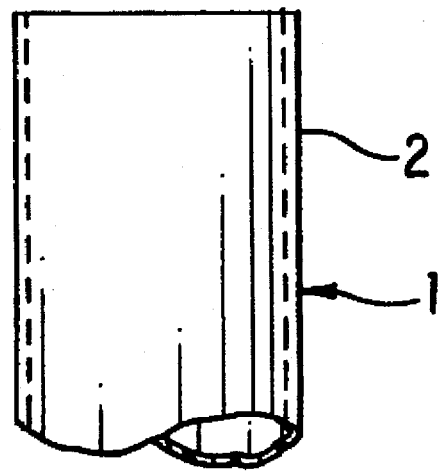
FIG. 1(b) is an elevational view thereof.

FIG. 1(a) shows a top view of a tubular body 1 of synthetic resin, and FIG. 1(b) shows an end portion 2 of the tubular body 1.

Figure 2A:
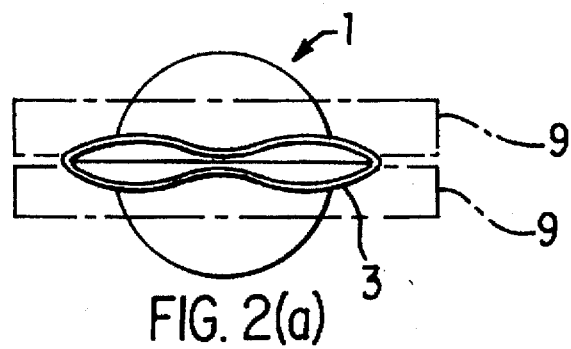
FIG. 2(a) is a top view of the tubular body shown in FIG. 1, showing that the end portion of the tubular body being pressed flat.
Figure 2B:
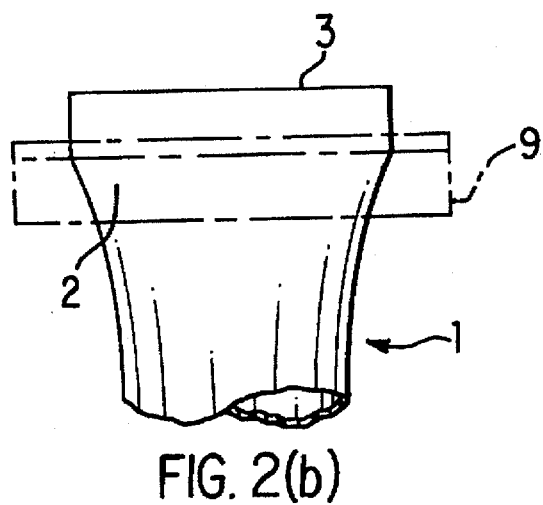
FIG. 2(b) is an elevational view of the tubular body shown in FIG. 2(a)

First, as shown in FIG. 2(a) and 2(b), the end portion 2 of the tubular body 1 is clamped and flattened by a pair of clamps 9 from its front and back sides, while a projecting end portion 3 is projected out of the clamps 9. By this clamping, the projecting end portion 3 becomes flat.

Figure 3:
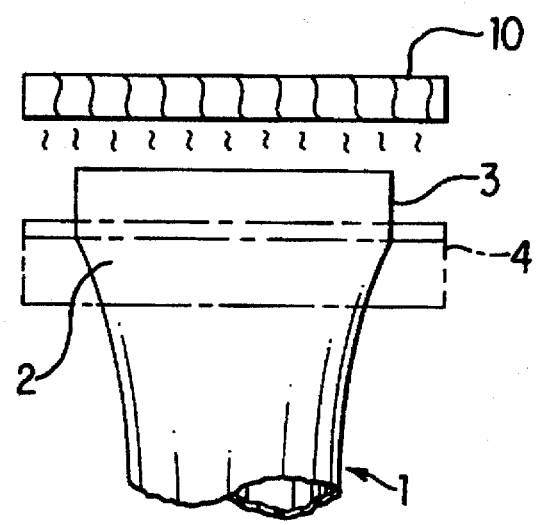
–FIG. 3 is an elevational view showing the end portion of the tubular body being heated by a heater.

Then, as shown in FIG. 3, the projecting end portion 3 is heated and fused by a heater 10, while the projecting end portion is still clamped by the clamps 9. The heater 10 comprises a cover 11 that controls the radiant heat of the heater to beam toward the projecting end portion 3.

Figure 4A:
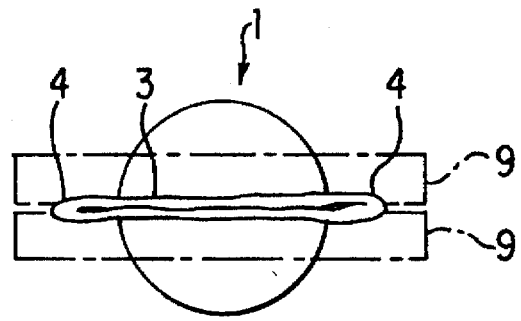
FIG. 4(a) is a top view showing the end portion as the heating process is almost completed.
Figure 4B:
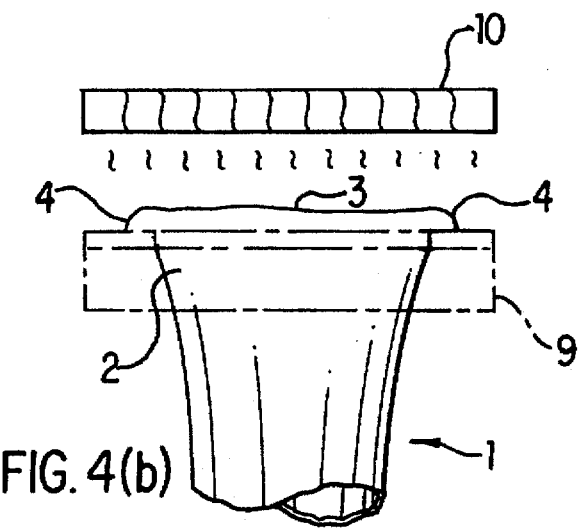
FIG. 4(b) is an elevational view thereof.
Figure 5:
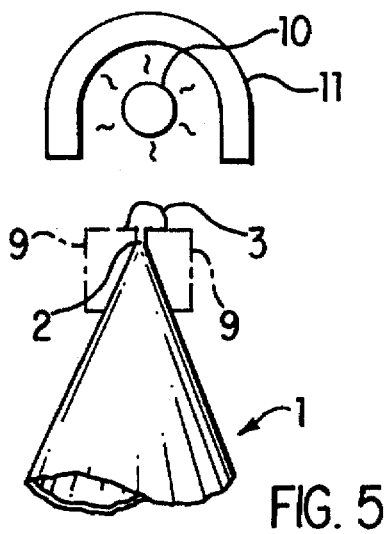
FIG. 5 is a side elevational view showing the heating process shown in FIG. 4.

By this heating process, the projecting end portion 3 is half fused and deformed as shown in FIG. 4(a). Note that a widely opened portion at a normal condition (FIG. 2(a) is closed by elasticity of resin (FIG. 4(a)). Also, as shown in FIG. 4(b), the height of the projecting end portion 3 is shortened by ½ to ⅓ times, producing side projecting portions 4 at both sides thereof extending laterally outward beyond the width of clamped end portion 2. Further, as shown in FIG. 5, a thickness of the projecting end portion 3 increases.

A heating temperature and a heating time of the projecting end portion 3 by the heater 10 should be determined depending on the property and chemical structure of synthetic resin used. In general, the projecting end portion 3 is heated for about 8 to 10 seconds to heat up an edge thereof to 180°–250° C.

Figure 6A:
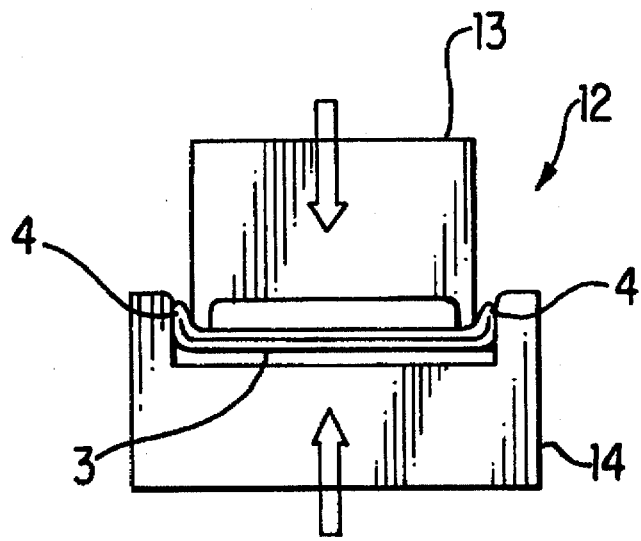
FIG. 6(a) is a top view showing a projecting end portion of the tubular body being bent by a bend means.
Figure 6B:
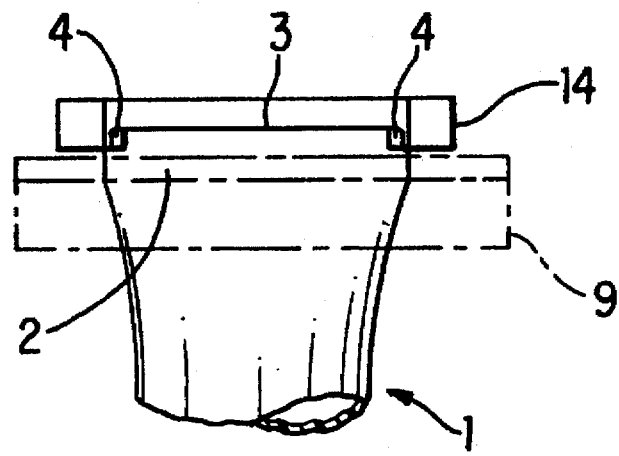
FIG. 6(b) is an elevational view thereof.

As shown in FIG. 6, immediately after the heating process of the projecting end portion 3 by the heater 10 is completed, both of the side projecting portions 4 are bent inwardly perpendicular to projecting end portion 3 by a bend means 12.

The bend means 12 comprises an outer jig 14 and an inner jig 13. The outer jig 14 is capable of moving perpendicular to the surface of the tubular body I above one of the clamps 9. The inner jig 13 is also capable of moving perpendicular to the tubular body 1 and it engages with the outer jig 14. The outer jig 14 comprises a concaved mold portion at a front side of the jig. The width of the concaved mold portion is the same as or slightly less (about 1 mm at most) than that of the flattened end portion 2. The inner jig 13 comprises a projected mold portion at a front side, which is inserted into the concaved mold portion of the outer jig 14. The width of the projected mold portion is sized to be less than the width determined by subtracting doubled thickness of the side projecting portion 4 from the width of the concaved mold portion of the outer jig 14. As the width of the projected mold of the inner jig 13 is determined as described above, the side projecting portions 4 can be bent without being damaged.

The outer jig 14 and the inner jig 13 are both moved toward the projecting end portion 3, which is clamped by the clamps 9 and is fused, and the projected mold portion of the inner jig 13 engages with the concaved mold portion of the outer jig 14, pressing the projecting end portion 3 in between the molds and bending the side projecting portions 4 inwardly toward a center of the mold until the side projecting portions 4 are substantially perpendicular to the flattened end portion 3.

The inner jig 13 and the outer jig 14 are both cooled prior to the bending process. A time required for this bending process is only 0.2–0.3 seconds. As shown in FIG. 6(a), it is arranged that only the side projecting portions 4 make actual contact with the inner jig 13 and the outer jig 14. Further, it is arranged that the side projecting portions are pressed and bent along a line that is 0–0.5 mm inside from an edge of the flattened end portion 2.

Such an arrangement as described above is performed to maintain the side projecting portions 4 in a bent position until the projecting end portion 3 is carried into a press mold means 15. To smoothly insert the projecting end portion 3 into a mold of a concave jig 17 of the press mold means 15, it is desired that the side projecting portions 4 keep their positions in a bent posture.

That is, it is arranged that only the side projecting portions 4 make direct contact with the cooled bend means 12, while the remaining portion of the projecting end portion 3 does not, to cool and solidify only the surface of the side projecting portions 4 in order to keep the side projecting portions 4 in bent positions temporarily. By doing so, at the time the end portion 3 is carried into the press mold means 15, the side projecting portions 4 are again fused effected by heat of a portion surrounding the side projecting portions, so that the projecting end portion 3 is smoothly placed into the press mold means 15 and is easily molded.

Figure 7A:
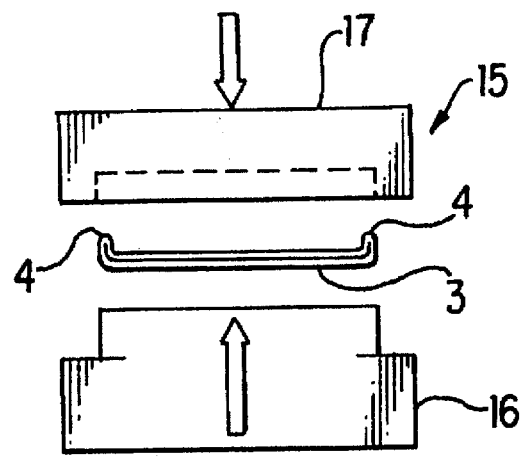
FIG. 7(a) is a top view showing the projecting end portion being pressed by a press mold means.

As shown in FIG. 7, the projecting end portion 3 comprising the side projecting portions 4 at both sides thereof at bent positions is quickly molded into a desired seal portion 5 by the press mold means 15.

The press mold means 15 comprises a concave jig 17 and a convex jig 16. The concave jig 17 is positioned above one of the clamps 9 and is capable of sliding perpendicular to the tubular body 1. Jig 17 comprises a depressed mold at its front side that faces the projecting end portion 3. The width of the depressed mold is the same as or slightly wider than that of the projecting end portion 3, which comprises the side projecting portions 4 in bent positions. However, the width of the depressed mold is never wider than that of the peripheral edge of end portion 2 in the flat, clamped posture. The convex jig 16 is positioned above the other clamp 9 and is capable of sliding toward the concave jig 17. Convex jig 16 comprises a projected mold at its front side, which tightly engages into the depressed mold of the concave jig 17. Therefore, no burrs are made around the edge of the seal portion 5 in the depressed mold of the concave jig 17 when the projecting end portion 3 is molded into the seal portion 5.

Figure 7B:
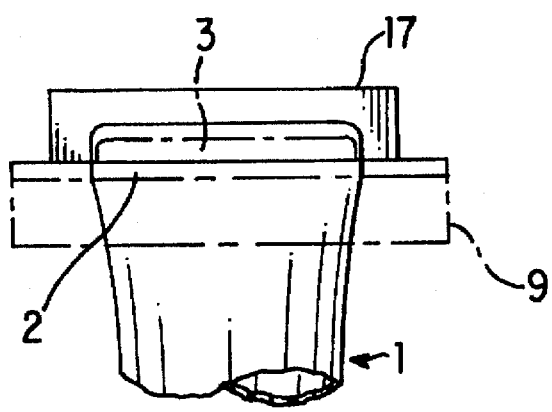
FIG. 7(b) is an elevational view thereof in which a convex jig is excluded.

According to an embodiment shown in FIG. 7, the width of the depressed mold of the concave jig 17 and the projected mold of the convex jig 16 is the same as the width of the flatly pressed end portion 2. The depressed mold of the concave jig 17 comprises round surfaces at top corners thereof as shown in FIG. 7(b). Further, the width of the depressed mold of the concave jig 17 is arranged slightly wider than that of the projecting end portion 3, comprising side projecting portions 4, so that the projecting end portion 3 can be smoothly put into the depressed mold of the concave jig 17.

The projecting end portion 3 is positioned in between the concave jig 17 and the convex jig 16, and both jigs 17, 16 slide toward the projecting end portion 3. The projecting end portion 3 is then pushed into the depressed mold of the concave jig 17 by the projected mold of the convex jig 16. It is pressed by the molds by a force of about 30 Kgf, while being cooled by the jigs 17, 16, and is formed into a seal portion 5.

The projecting end portion 3 is press molded by the press mold means 15 for about 0.5 seconds and is molded into the seal portion 5. At the same time, it is cooled by press mold means 15 to about 60° C.–80° C.—After the seal portion 5 is released from the press mold means 15, it is further cooled down to the atmosphere temperature, such as by air.

Figure 8:
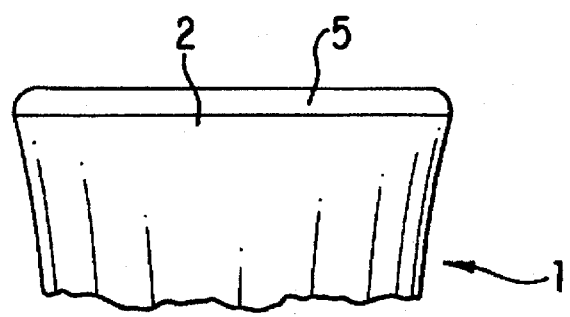
FIG. 8 is an elevational view showing a seal portion.

FIG. 8 shows a seal portion 5 formed by the press mold means 15. The width of the seal portions 5 is the same as that of the end portion 2, making continuous smooth lines at both sides of the tubular body 1. Both corners of the seal portion 5 are rounded and the top edge thereof is straight and smooth.

Figure 9:
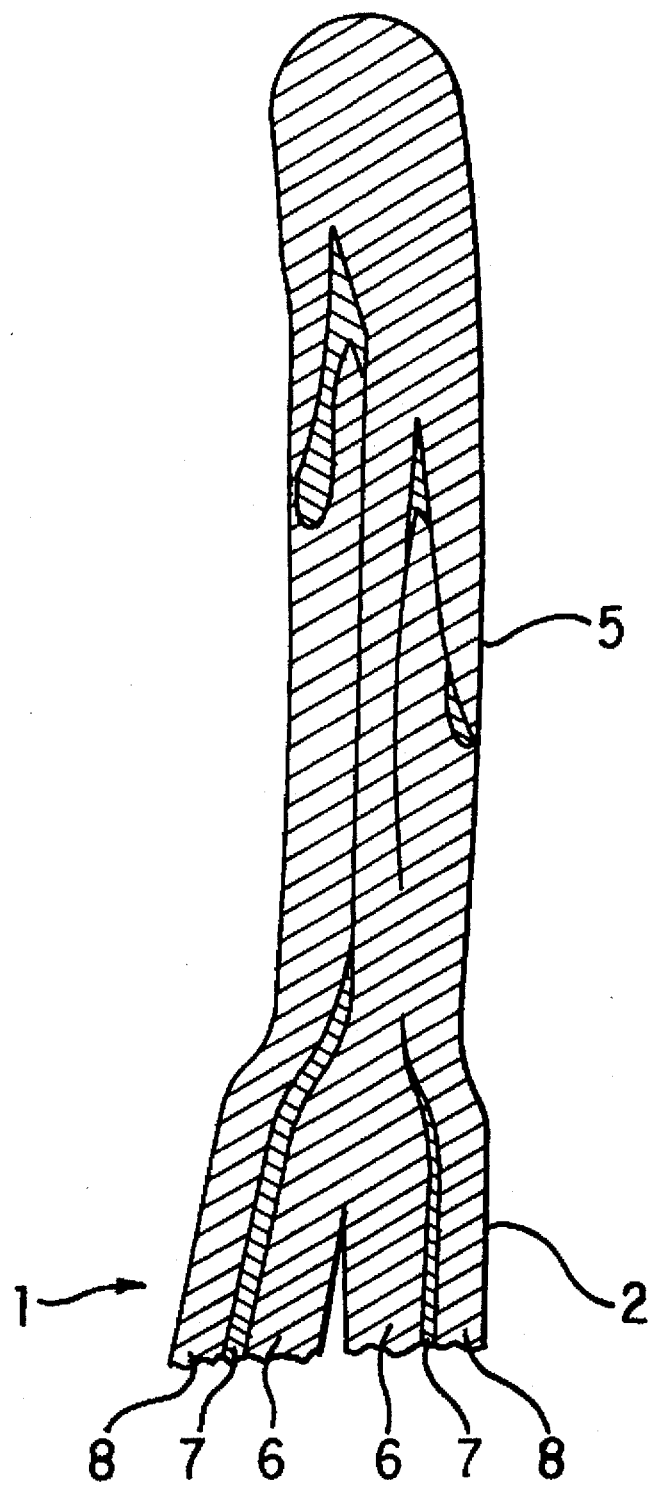
FIG. 9 is an enlarged sectional side elevation view of the seal portion shown in FIG. 8.
Figure 16:
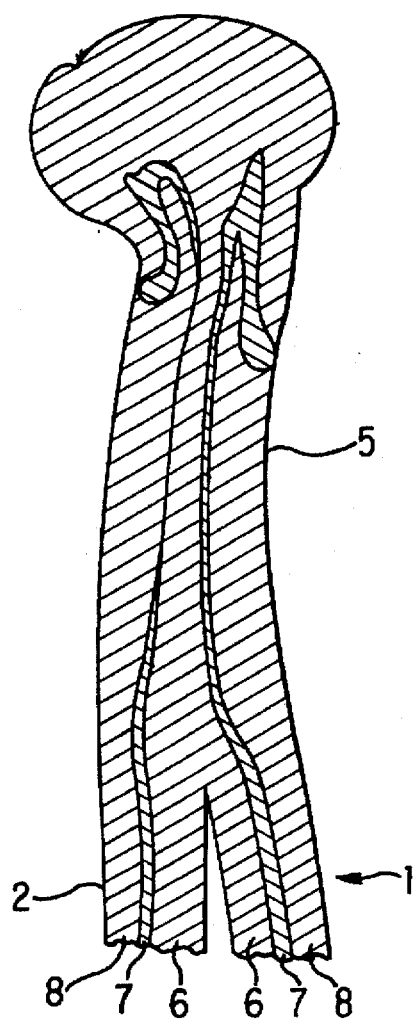
FIG. 16 is an enlarged sectional side elevation view of the seal portion shown in FIG. 15.

FIG. 9 shows an enlarged sectional view of a seal portion 5 of a tubular body 1 molded according to the invention. The tubular body I is composed of an inner layer 6 and an outer layer 8, both made of low density polyethylene resin, and a middle layer 7 positioned in between the inner layer 6 and the outer layer 8. The middle layer 7 is made of ethylene vinyl alcohol copolymer resin. In between each layer 6, 7, 8, an adhesive layer is fixed (not shown in FIG. 9). FIG. 16 shows a seal portion 5 of a tubular body 1 according to the prior art, in which the seal portion 5 is formed by being pressed in an open space. Compared to the seal portion 5 according to the prior art shown in FIG. 16, the seal portion 5 according to the present invention shown in FIG. 9 comprises considerably less area in sectional view, since it is pressed and molded in a closed mold space. Therefore, the density of the seal portion 5 is much higher than that of the prior art.

Figure 10:
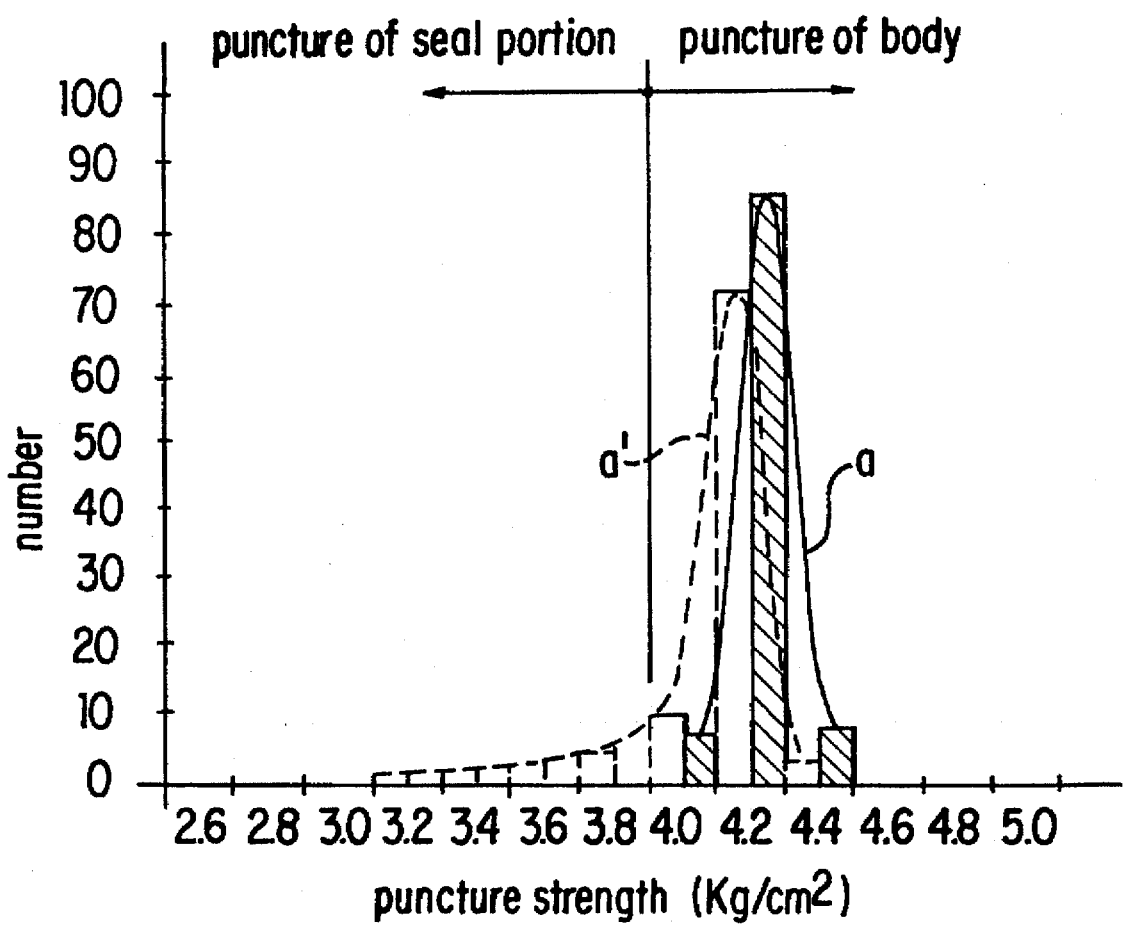
FIG. 10 is a graph showing puncture test data of the seal portion of a tubular body having a single layer according to the present invention in comparison to the prior art.

FIG. 10 to 14 show test data comparing the strength of the seal portion 5 of tubular bodies I according to the present invention and the prior art. FIG. 10 shows puncture test data which was performed with a type of tubular body 1 which composes a single layer made of low-density polyethylene resin. One hundred test pieces of the seal portion 5 according to the present invention and the same number of that of the prior art are used in the test. The line (a) indicates puncture test data of the seal portion 5 according to the present invention, and the line (a') indicates that of the prior art. As the line (a) shows, none out of one hundred seal portions 5 punctured. On the other hand, as the line (a') shows, some of the prior art seal portions punctured. It was found that the seal portion 5 according to the present invention is improved in strength (about 30%) compared to that of the prior art.

Figure 11:
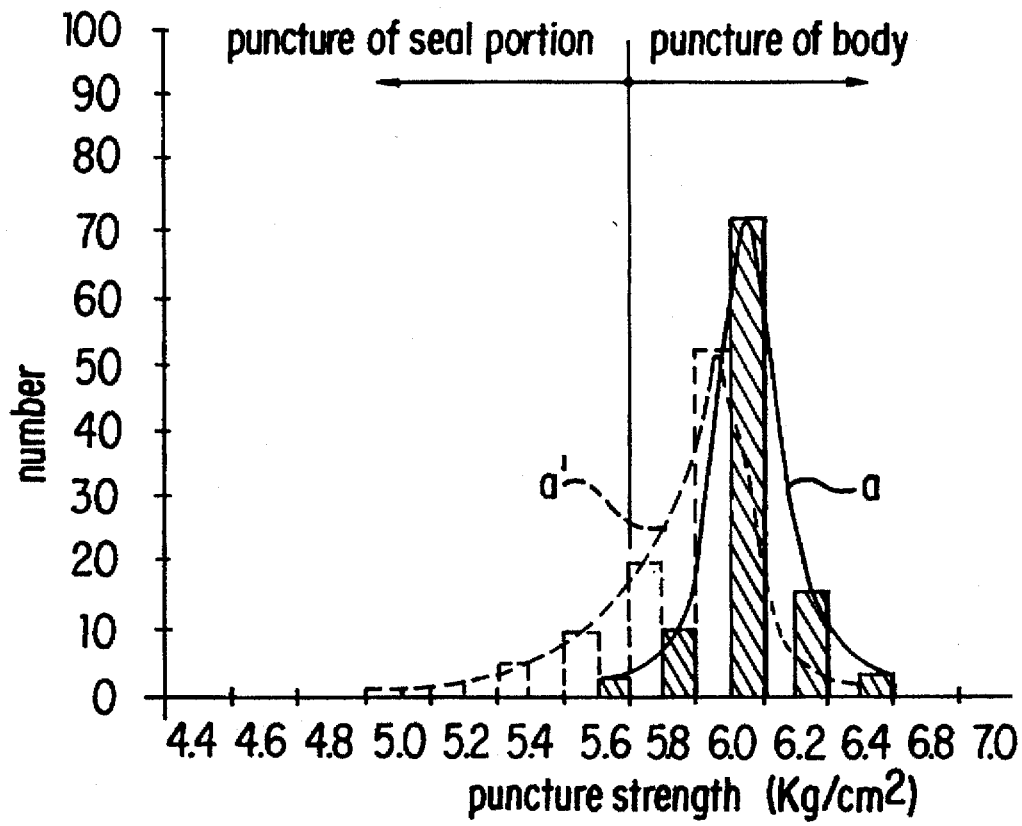
FIG. 11 is a graph showing puncture test data of the seal portion of a tubular body having plural layers according to the present invention in comparison to the prior art.
Figure 12:
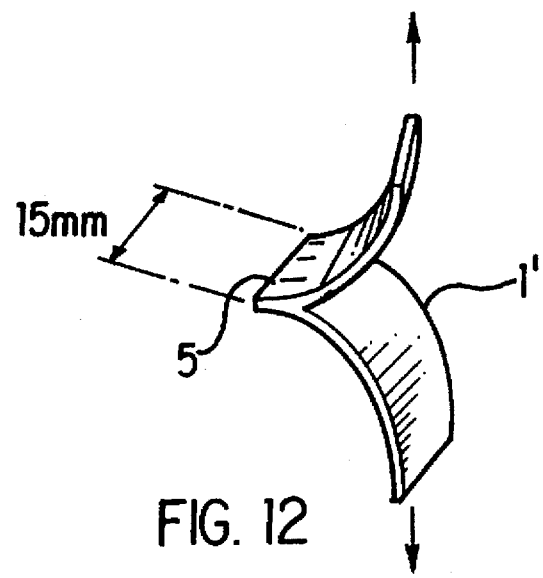
FIG. 12 is a perspective view of a piece of the tubular body used for a tensile strength test.

FIG. 11 shows another puncture test data comparing strength of the seal portion 5 according to the present invention and the prior art. One hundred test pieces of each, two hundreds in total, are used in the test. A type of tubular body used in this test is composed of a plural number of layers. The line (a) indicates the strength feature of the present invention and the line (a') indicates that of the prior art. It is clear from this test data that the strength of the seal portion 5 according to the present invention is considerably improved compared to that of the prior art. As the line (a) shows, among the pieces (seal portions 5) according to the present invention, a very small number thereof punctured. The reason is supposed that an inner layer 6 happened to include an uneven portion in thickness, and stress concentrated to the thinner portion.

Figure 13:
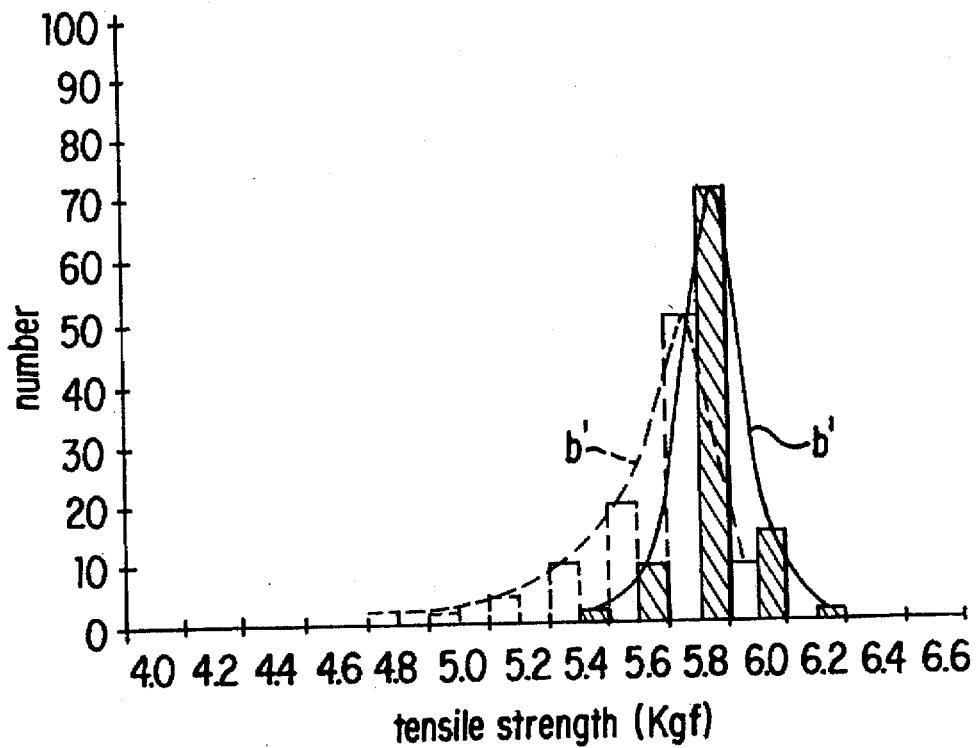
FIG. 13 is a graph showing tensile strength test data of the seal portion of the tubular body having a single layer according to the present invention in comparison to the prior art.
Figure 14:
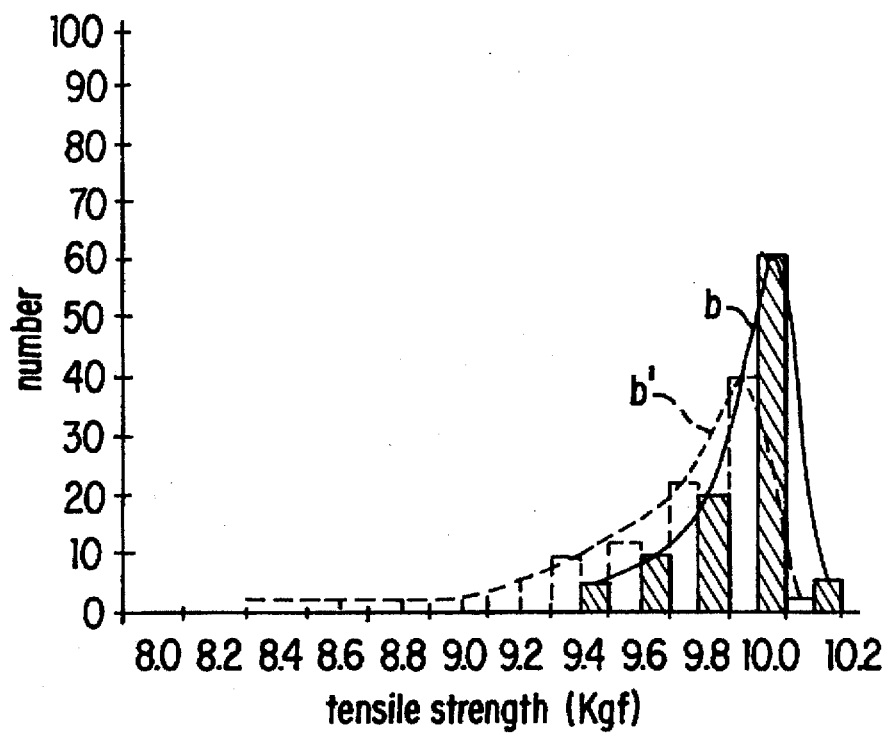
FIG. 14 is a graph showing tensile strength test data of the seal portion of the tubular body having plural layers according to the present invention in comparison to the prior art.
Figure 15:
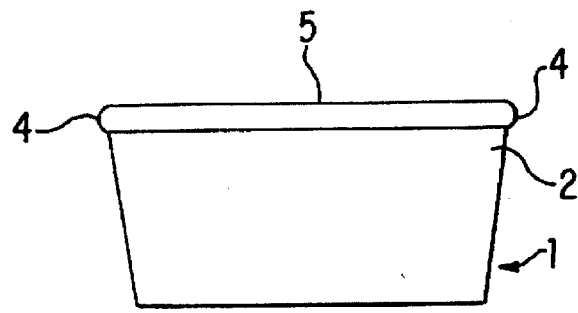
FIG. 15 is an elevational view of a seal portion of a tubular body according to the prior art.

FIG. 13 and 14 show test data in tensile strength of the seal portion 5 according to the present invention and the prior art. The tests were performed using pieces 11 shown in FIG. 12. Each piece 1' is prepared by cutting the seal portion 5 of a tubular body into 15 mm length and width. The tensile strength test was performed by pulling the piece 1' in the arrowhead directions with 300 mm/min of tensile speed.

FIG. 13 shows the test data performed with pieces 1' composed of a s4@ngle layer. FIG. 14 shows the test data done with pieces 1' composed of plural layers. The line (b) indicates the feature of tensile strength of the pieces 1' according to the present invention, and the line (b') indicates that of the prior art. According to those test data, it is evident that the tensile strength of the seal portion 5 according to the present invention is considerably improved compared to that of the prior art.

According to the invention, the fused projecting end portion is placed into a mold of the press mold means and is formed into a seal portion, so that the seal portion of a tubular body can be formed into any desired shape.

The projecting end portion is pressed in a closed mold space, so that a cubic volume thereof decreases and density thereof increases, and that a mechanical strength of the seal portion improves. Further, by being pressed in the closed space, an adhesive strength of the seal portion increases, forming the seal portion having a firm adhesive strength.

In case a tubular body is composed of plural layers including a gas barrier layer, the layer decomposes and foams caused by heat. However, the layer is firmly pressed, so that the foam is prevented from being grown into enlarged continuous foam. Also, decreased adhesive strength of the seal portion caused by the enlarged continuous foam is prevented, and substance in the tubular body does not leak through the foam. Therefore, according to the invention, high quality tubes can be provided.

I claim:

1. A method for forming a seal portion of a tubular body of synthetic resin, which comprises the process of:
   clamping an end portion of a tubular body of synthetic resin flat by a pair of clamps to form a clamped, flattened end portion of a predetermined width and an original volume and a projecting end portion projecting out of said clamps;
   heating and fusing said projecting end portion, said heating and fusing forming side projecting portions of said projecting end portion projecting outward from opposing sides of said projecting end portion beyond said width of said clamped, flattened end portion;
   bending said side projecting portions inwardly substantially perpendicular to said clamped, flattened end portion; and
   pressing said projecting end portion including said side projecting portions into a desired shape to form a seal portion, while reducing a cubic volume of said projecting end portion to 0.65–0.80 times the original volume.

2. The method for forming a seal portion of a tubular body of synthetic resin claimed in claim 1, wherein,
   each of said side projecting portions is bent along an axial imaginary line about 0–0.5 mm inside a peripheral edge of said clamped, flattened end portion.

3. A method for forming a seal portion of a tubular body of synthetic resin, which comprises the process of:
   clamping an end portion of a tubular body of synthetic resin flat by a pair of clamps to form a clamped, flattened end portion of a predetermined width and a projecting end portion projecting out of said clamps;
   heating and fusing said projecting end portion, said heating and fusing forming side projecting portions of said projecting end portion projecting outward from opposing sides of said projecting end portion beyond said width of said clamped, flattened end portion;
   bending said side projecting portions inwardly substantially perpendicular to said clamped, flattened end portion; and
   pressing said projecting end portion including said side projecting portions into a desired shape to form a seal portion, while reducing and restricting decomposition and foaming of the synthetic resin.

4. The method for forming a seal portion of a tubular body of synthetic resin claimed in claim 3, wherein,
   each of said side projecting portions is bent along an axial imaginary line about 0–0.5 mm inside a peripheral edge of said clamped, flattened end portion.

5. An apparatus for forming a seal portion of a tubular body of synthetic resin which comprises:
   a pair of clamps, which clamp an end portion of a tubular body of synthetic resin flat to form a clamped, flattened end portion having a width and a projecting end portion projecting axially from said clamps;
   a heater, which heats and fuses said projecting end portion to form a fused projecting end portion having side projecting portions extending outside of said clamped end portion width;
   a bend means for bending said side projecting portions toward a center of said bend means to form inwardly bent side projecting portions; and
   a press mold means for pressing said projecting end portion including said inwardly bent side projecting portions to form a seal portion.

6. An apparatus for forming a seal portion of a tubular body of synthetic resin as claimed in claim 5, wherein,
   said bend means comprises an outer jig and an inner jig,
   said outer jig is capable of sliding above one of said clamps toward said projecting end portion, said outer jig comprises a right angled concaved mold facing said projecting end portion, said concaved mold has a width which is substantially the same as a width of said flattened end portion,
   said inner jig is capable of sliding above another of said clamps toward said projecting end portion, said inner jig comprises a projected mold facing said projecting end portion, said projecting mold has a width such that it does not disturb the bending formation of said side projecting portions in said concaved mold of said outer jig.

7. An apparatus for forming a seal portion of a tubular body of synthetic resin as claimed in claim 6, wherein, said width of said concaved mold of said outer jig is less than 1 mm shorter than said width of said clamped, flattened end portion.

8. An apparatus for forming a seal portion of a tubular body of synthetic resin as claimed in claim 5, wherein, said press mold means comprises a concave jig and a convex jig, said concave jig is capable of sliding above one of said clamps toward said projecting end portion, said concave jig comprises a concaved mold facing said projecting end portion, said concaved mold has a width which is substantially the same as said projecting end portion comprising said bent side projecting portions, said convex jig is capable of sliding above another of said clamps toward said projecting end portion, said convex jig comprises a projected mold facing said projecting end portion, said projected mold engages with said concaved mold of said concave jig such that no burr is formed when the projecting end portion is pressed in said concaved mold of said concave jig.

* * * * *